United States Patent [19]

Abe et al.

[11] 4,325,081

[45] Apr. 13, 1982

[54] PROGRAMMED TIMER FOR VTR

[75] Inventors: Yuuhei Abe, Yokohama; Katsuo Mohri, Yokosuka, both of Japan

[73] Assignee: Hitachi, Ltd., Tokyo, Japan

[21] Appl. No.: 163,297

[22] Filed: Jun. 26, 1980

[30] Foreign Application Priority Data

Aug. 10, 1979 [JP] Japan ................................ 54-101272

[51] Int. Cl.³ .............................................. H04N 5/76
[52] U.S. Cl. ..................................... 358/127; 434/335;
434/308; 307/141.4; 340/309.4; 455/231;
455/171; 455/181; 364/144; 364/188; 360/33
[58] Field of Search ................................ 360/33, 137;
179/100.11; 358/127, 192.1; 364/104, 120;
455/231, 171, 181; 369/6, 7; 434/335, 308, 324,
365, 366; 340/309.4; 307/41, 141.4

[56] References Cited

U.S. PATENT DOCUMENTS 4,081,754  3/1978  Jackson ............................... 455/181
4,158,432  6/1979  Van Bavel ........................ 340/309.4
4,193,120  3/1980  Yello ..................................... 360/33

Primary Examiner—Bernard Konick
Assistant Examiner—Alan Faber
Attorney, Agent, or Firm—Craig and Antonelli

[57] ABSTRACT

A programmed timer for presetting a video tape recorder for the time and reception channel when the video tape recorder starts and ends, comprising a processor circuit for processing the type of the data entered for reservation in a predetermined order, and means for sequentially displaying a procedure to be next entered each time data are entered. The operator is required to enter the necessary data simply according to the displayed procedure in order to set the desired reservation data for the programmed timer.

10 Claims, 8 Drawing Figures

PROGRAMMED TIMER FOR VTR

BACKGROUND OF THE INVENTION

This invention relates to a programmed timer which can control a plurality of actions. More specifically, this invention relates to a programmed timer which allows an indication of a setting procedure to be conducted when an operator sets the timer to selectively operate a device in conjunction with the timer.

A remarkable development in semiconductor integrated circuits has enabled a mass production of an electronic clock which is based on a particular oscillator, which leads to the fact that the production cost per electronic clock will be reduced greatly. At present, most families own a timer based on such an electronic clock. This type of electronic timer is capable of issuing a plurality of signals at different times. For example, a combination of such an electronic timer and a television set will allow an automatic reception of desired broadcasting channels at every preset time in a day or in a week, or a combination of the electronic timer and a video tape recorder will allow an automatic recording of the received signals of selected channels at every preset time.

FIG. 1 is a control panel, as an example, of a prior art programmed timer which is based on the above-mentioned electronic timer and ideal for use with a video tape recorder, including setting section and a time indication section.

The timer shown in FIG. 1 is designed to allow a reservation of three programs a week. Now, explanation will be made about how to operate the timer. In order to put the timer into the normal time-setting condition or mode, first, the operator moves a mode switch 1 to a "TIME ADJUST" position and sets the current exact time through push-button switches 4, 5 and 7 which are, respectively, used to set hour, minute and day. After setting the current time, the operator moves the mode switch 1 to an "INDICATION" position. Under this condition, the timer will start the time function. The procedure up to here is conducted only when the timer is used for the first time or when the timer shows a wrong time. In order to make video reservations in combination with a video tape recorder, the operator places the mode switch 1 to a "PROGRAM" position and turns a program selection switch 2 to an "ON" position of a desired program number. Then, the operator sets the timer for the time when the selected program starts, with the push-button switches 4, 5, 6 and 7. The push-button switch 6 is used to set a desired receiving channel. After setting the program starting data, the operator turns the program selection switch 2 to an "OFF" position of the same reservation program number. The operator then sets the time when the reserved program ends, using the push-button switches 4, 5 and 7. Now, the reservation procedure of one program has been completed. Switching the program selection switch 2 into another position and similar procedure to that in the above, as necessary, will allow a setting of three programs. After this, if the operator returns the mode switch 1 to the "INDICATION" position, the timer has been completed with respect to the video reservation procedure. Therefore, at every set time, recording will be made of the receiving signal on the preset or reserved channel.

In this way, input information of the multiprogrammed timer for a video tape recorder includes the day on which the reserving program starts and ends, the time when the reserving program starts and ends, and the selected television channel. Since the operator must handle the mode switch 1 and the program selection switch 2 in accordance with the above input information, failure to check the switches after every information input might cause the input of faulty information. In addition, the prior art timer has a disadvantage in that when it takes much time for reservation of many programs, and therefore, it tends to cause operator's faulty operations of the switches.

SUMMARY OF THE INVENTION

It is an object of the present invention to provide a novel programmed timer which minimizes operator's faulty operations when the operator sets data such as time for the timer, thereby allowing the use of an unskilled person.

To obtain the above object, the present invention is characterized in that the timer according to the present invention is provided with display means which sequentially indicates the type or title of data to be next entered for each data, the entering order of whose data is predetermined.

According to one of the features of the present invention, the operator is required only to enter the necessary data according to the title of input information indicated by the display means, which results in easy handling of the timer and less faulty operations.

BRIEF DESCRIPTION OF THE DRAWINGS

The above object and other objects and advantages of the present invention will become clear from the following descriptions with reference to the accompanying drawings, in which.

DESCRIPTION OF THE PREFERRED EMBODIMENT

Figure 1:
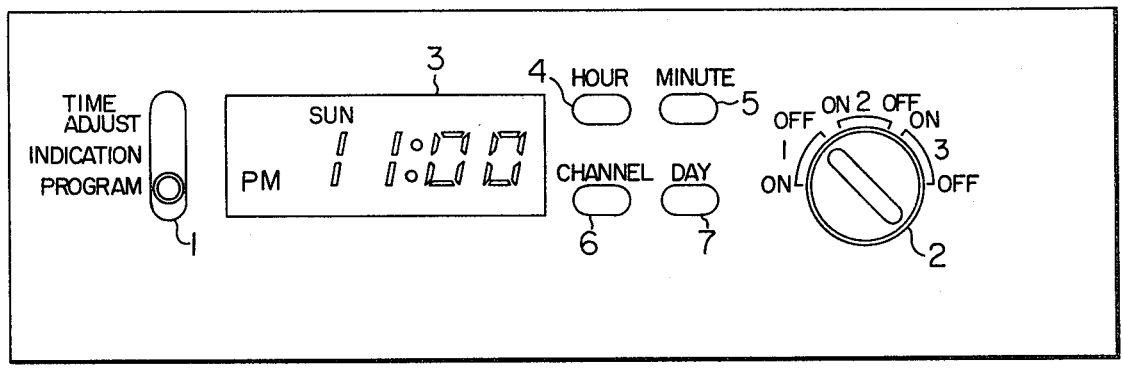
FIG. 1 is a front view of a control panel, as an example, of a prior art timer, which includes a setting section and a time indication section.
Figure 2:
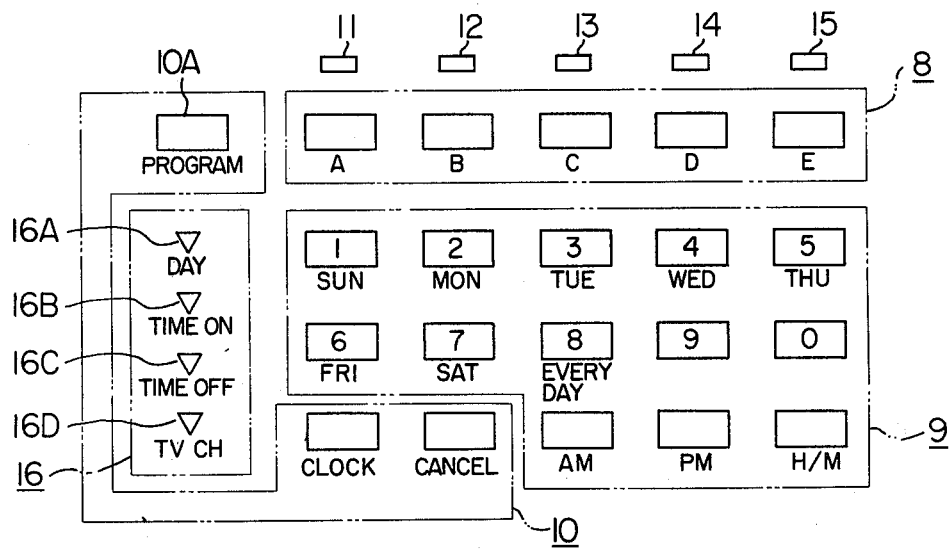
FIG. 2 is a top view of a control panel of a programmed timer according to one embodiment of the present invention, which consists of an input pushbutton section and an LED indication section.
Figure 3:
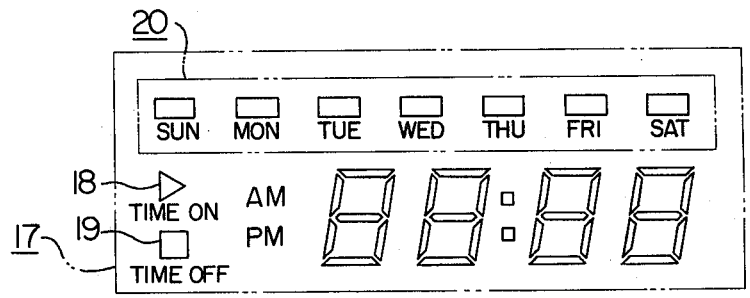
FIG. 3 is a front view of the time indication section of the timer according to the present invention.

Referring now to FIGS. 2 and 3, there is shown a control panel of a programmed timer according to the present invention, which consists of a data setting section and a time indication section and is designed for use with a video tape recorder.

In FIG. 2, the data setting section is divided into four groups, that is, a reservation read button group 8, a data button group 9, a mode button group 10, and the associated indicator (for example, based on LED) groups 11 to 16. The indicator 16 further includes LED's 16A to 16D which indicate the day, program starting time, program ending time, and TV channel for the operator to direct attention to the type of data to be entered, respectively. On the other hand, the time indication section in FIG. 3 comprises a digital display device, for example, a fluorescent indicator tube for time indication, an LED 20 for day indication, LED's 18 and 19 for program starting- and ending-time indication. When the operator wishes to check the data already stored in the timer, he pushes a desired one of the reservation read buttons A to E to put the timer into the reservation read mode. In the reservation read mode, the corresponding reserved data is indicated on the fluorescent indicator tube 17. There are two types of the reserved data, that is, starting time of the recording and ending time of the recording. These times are identified with the LED's 18 and 19. The program starting and ending times of the reserved data are alternately indicated with a constant period of time and then the timer automatically returns to the clock indication mode.

Further, when the operator wants to change the reserved contents or to set new contents, he is required only to push a desired mode button during the reservation read mode to move the timer into the corresponding mode.

In this way, with the arrangement of the present invention, simply pushing a desired one of the reservation read buttons A to E will provide the associated reservation read operation to indicate the associated reservation contents, whereby the operator can check the contents easily. This function of automatic returning to the clock indication mode, at the same time, can eliminate such a problem as the operator often forgets to return the control switches to the proper positions.

Figure 4:
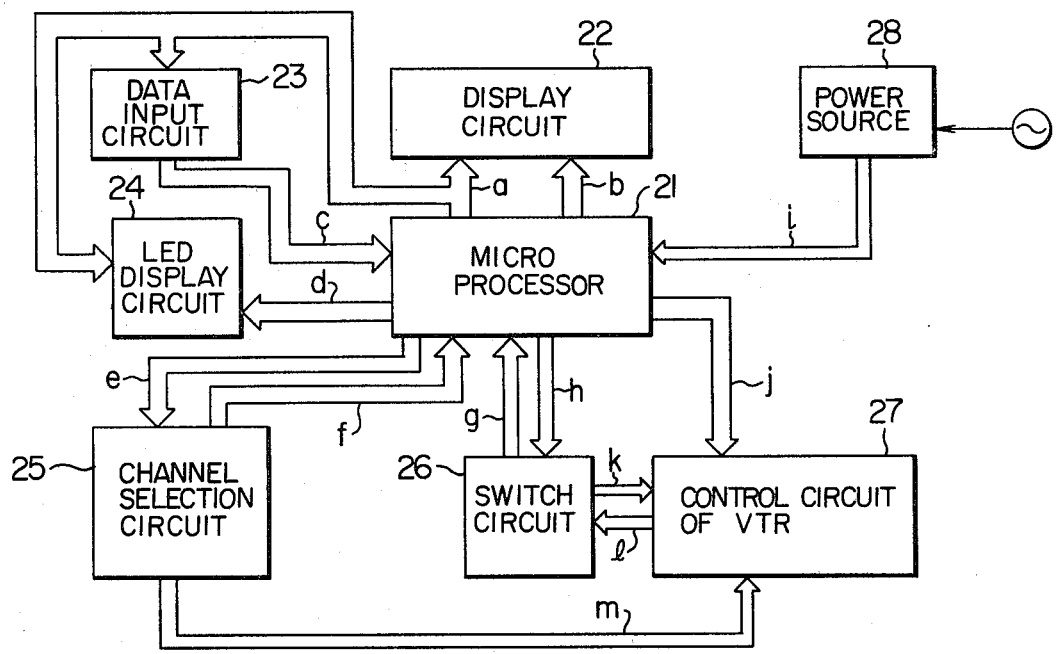
FIG. 4 is a block diagram of the timer according to one embodiment of the present invention.

The present invention will now be explained with reference to the more detailed embodiment. There is shown in FIG. 4 a block diagram of the timer according to an embodiment of the present invention wherein a micro processor 21 is provided to receive input data and execute the data for display and clock processing.

More specifically, the micro processor 21 supplies a dynamic signal "a" and a display data signal "b" to a display circuit 22 to drive the fluorescent indicator tube 17 therein. The dynamic signal "a" is also applied from the micro processor 21 to a data input circuit 23 and an LED display circuit 24. The data input circuit 23 supplies an output signal "c" back to the micro processor 21 to generate the display data signal "b" and an LED display data signal "d". On the other hand, the micro processor 21 accepts channel selection data in the form of an output signal "f" from a channel selection circuit 25 to issue a channel selection output signal "e" in response to the signal "f". The channel selection output signal "e" from the micro processor 21 is applied back to the channel selection circuit 25 which feeds a corresponding channel selection signal "m" to a control circuit 27 of the associated video tape recorder.

A switch circuit 26 has two outputs "g" and "k". The signal "g" is representative of the operation state of the video tape recorder and is sent to the micro processor 21, while the signal "k" is sent to the VTR control circuit 27 to decide the operation mode of the video tape recorder. If the video tape recorder is in the timer mode, a process output signal "j" is applied from the micro processor 21 to the VTR control circuit 27 depending on the time. Further, the micro processor 21 receives a clock reference signal "i" from a power source circuit 28 and counts the signal "i" for clock processing.

Figure 5:
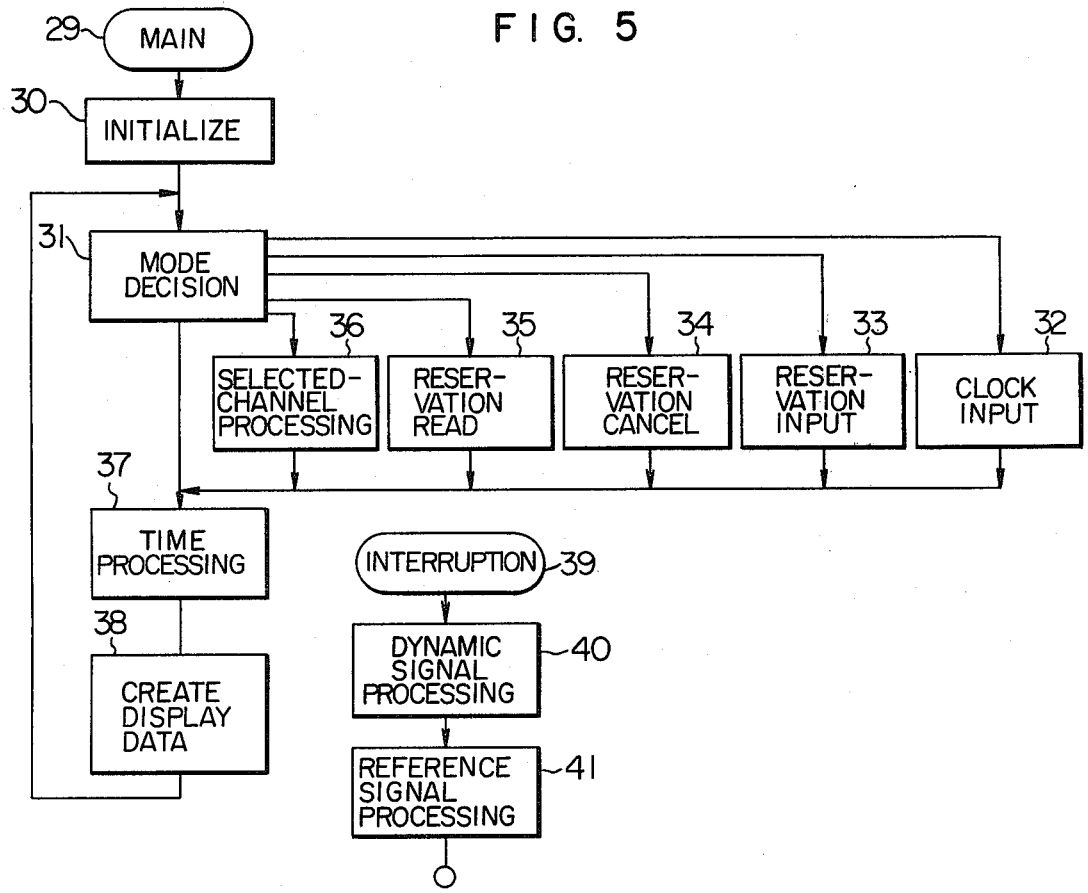
FIG. 5 is a general flow chart of the operation of the timer according to the present invention.

Turning next to FIG. 5, there is shown a flow chart of the operation of the micro processor 21. As soon as the micro processor 21 is put into the active mode, first, it starts with a main process box 29. In the main process, the micro processor will execute initializing at an initialize box 30. This initialization causes all the registers, input/output terminals and RAM within the micro processor 21 to be put into their initial state. After the initialization, control goes to a mode decision box 31 where the data entered through an interruption box 39 are checked and as soon as mode data is received, the micro processor 21 will execute the associated one of the routines 32 to 36.

At the clock input box 32, clock input processing includes inputting of the clock data and zero second starting. At the reservation input box 33, the micro processor accepts the data (time data and channel selection data) on reservation.

At the reservation cancel box 34, the micro processor 21 cancels the corresponding reservation data and returns the timer to the clock indication mode.

At the reservation read box 35, the micro processor 21 indicates the corresponding reservation data alternately and later returns the timer to the clock indication mode. At the selected-channel processing box 36, the micro processor 21 causes the selected channel portion of the associated video tape recorder to be activated in response to the selected channel input signal. After these mode processing operations, control proceeds to a time processing box 37 where the micro processor 21 detects the time coincidence between the reserved data and the current clock time. At the same time, the micro processor causes the computation of the clock section of the timer in response to data at a reference signal processing box 41, together with the processing necessary after the time coincidence. Then, control moves to a display data creating box 38. At the box 38, the micro processor 21 transfers the display data on each mode to the associated display buffer. After this, control goes back to the mode decision box 31 and the above procedure will be repeated. On the other hand, if the micro processor receives a clock reference signal, it will execute the interruption 39 prior to the main process 29. In the interruption 39, first, the micro processor 21 executes a dynamic signal processing box 40. At the box 40, the micro processor 21 will issue 6 phase dynamic pulses sequentially and display output signals from the electron ray indicator tube and LED's, and receive an output signal from the data input circuit 23. As soon as the micro processor 21 has finished the dynamic signal processing 40, control proceeds to the next reference signal processing box 41 to add the clock reference signal data.

Figure 6:
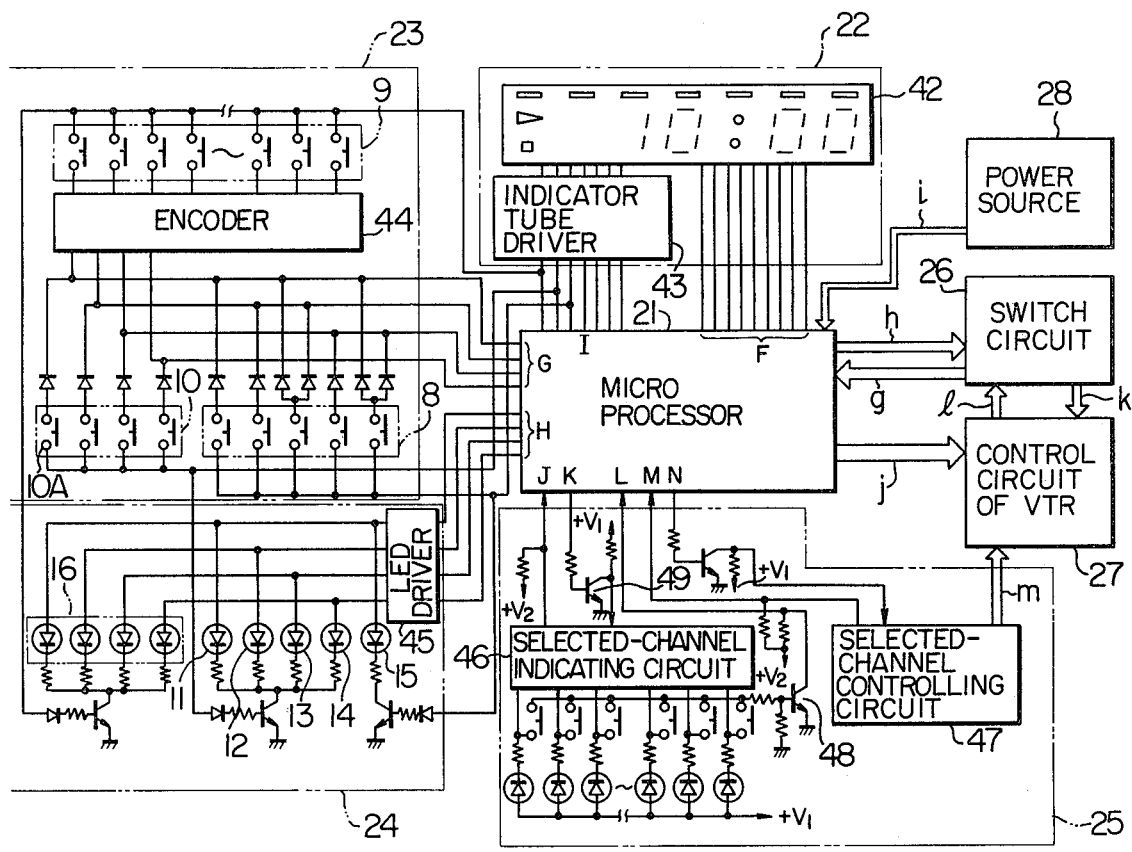
FIG. 6 is a detailed circuit diagram of the timer according to one embodiment of the present invention.

There is shown in FIG. 6 a detail circuit diagram of the programmed timer, in which outputs from the data push-button group 9 are converted into 4 bit data through an encoder 44 which consists of diodes. The 4 bit data is then connected to a group of input terminals G of the micro processor 21.

The fluorescent indicator tube 42 receives 6 phase signals from a group of terminals I of the micro processor 21 via a driver 43 of the fluorescent indicator tube and the data associated with the signals from a group of terminals F thereof. 3 phase signals of these 6 phase signals are used to enter the data from the data pushbutton 9, the mode push-button 10 and the reservation read push-button 8, respectively. Furthermore, 3 of the phase signals are used as display pulses for the input indication LED 16, the reservation display LED's 11 to 14, and the reservation display LED 15, respectively. That is, for each phase pulse, display data is connected from a group of terminals H of the micro processor 21 via an LED driver 45 to the LED's 11 to 16 to illuminate or activate any of the LED's according to the display data. Since the input data is applied to the group of terminals G of the micro processor 21 in the form of different phase pulses as shown in FIG. 6, they can be easily identified within the micro processor 21. Since the channel selection push-buttons are used also as the selected-channel input push-buttons at the time of reservation in the channel selection circuit 25, the selecting operation of the channel selection circuit 25 is achieved by means of the micro processor 21. More specifically, when the user pushes a desired channel selection push-button, a transistor 48 is turned on, whereby a terminal L on the micro processor 21 changes to a low level. As soon as the micro processor 21 detects a low level at the L terminal, it will supply a pulse from a terminal K thereon to a channel-up input terminal of a selected-channel indicating circuit 46, and at the same time it will check the level at a terminal J. Since a low level at the terminal J means that the selected-channel indicating circuit 46 is in the reset mode, the micro processor 21 supplies a pulse from the terminal K to the selected-channel indicating circuit 46 to check a high level at the terminal L on the micro processor. Since the number of the pulses from the resetting of the selected-channel indicating circuit to the change of the terminal L to a high level will correspond to the operator's selected channel push-button, the pulse number is used as selected-channel data. After this, the micro processor 21 controls a selected-channel controlling circuit 47 according to the operational mode, in the similar way to that for the selected-channel indicating circuit.

Now, explanation will be made with reference to FIGS. 7 and 8 about how the input indication LED 16 operates in the reservation input mode, which forms the gist of the present invention.

Figure 7:
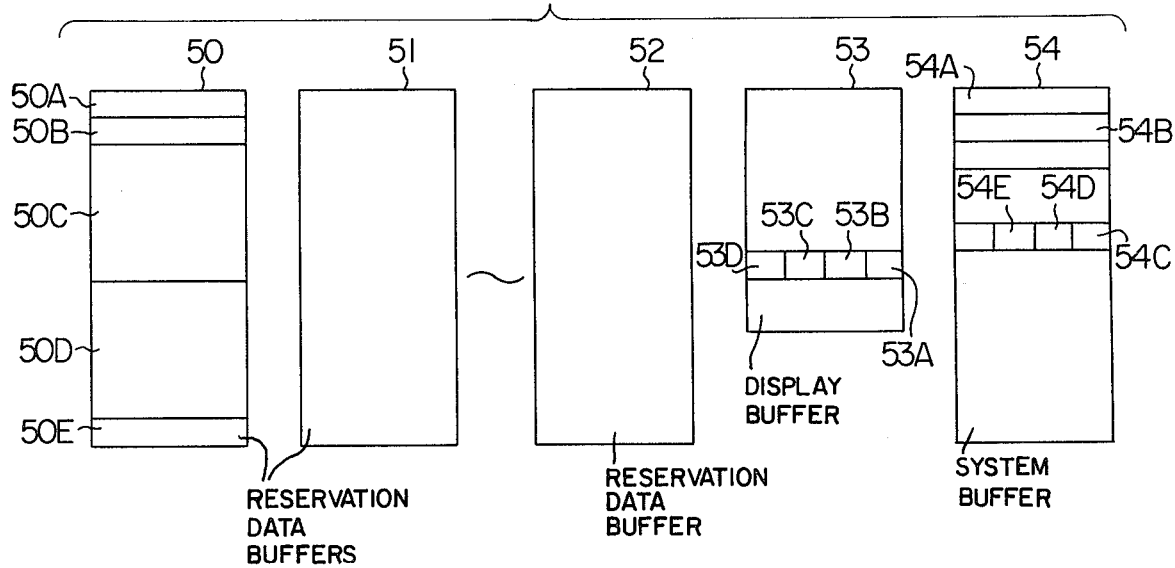
FIG. 7 is a schematic view which shows how data are stored in the RAM memory of the micro processor of the timer according to the present invention.
Figure 8:
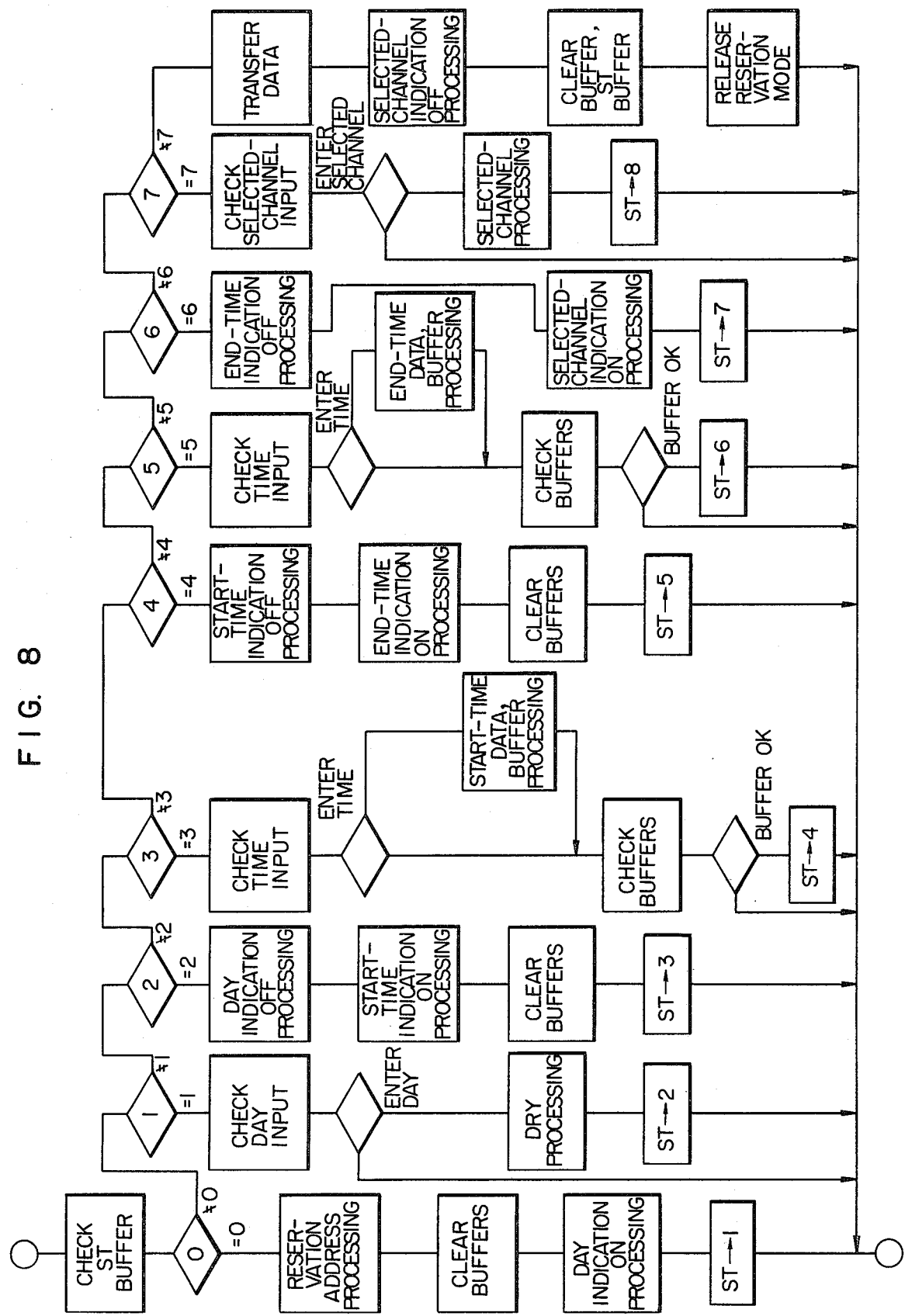
FIG. 8 is a detailed flow chart of the reservation input processing box 33 of the timer according to the present invention, which forms a gist of the present invention.

FIG. 7 shows a schematic diagram of part of the RAM in the micro processor 21, and FIG. 8 is a flow chart showing the detailed processing procedure in the reservation input processing box 33. When the user pushes a desired one of the reservation read push-button group 8 and further the "PROGRAM" reservation push-button 10A, the micro processor 21 will be placed into the ready mode for the reservation input processing 33. In the reservation input processing 33, the micro processor 21 starts with checking an ST buffer, as shown in FIG. 8. The ST buffer has a memory storage area of 1 word (4 bits) in the internal RAM of the micro processor 21, and increases its contents by +1 sequentially through the reservation input processing 33.

Since the ST buffer 54A has zero contents, the micro processor proceeds to reservation address processing. In the reservation address processing, the micro processor stores the number of the operator's reservation push-button into an address buffer 50A of a reservation data buffer 50. Then, the processor clears the buffers 54B to 54E necessary in the reservation input processing 33 out of a system buffer 54. After this, the processor goes to day indication ON processing in which LED buffers 53A to 53D are provided in a display buffer 53 to illuminate the input indication LED's 16 so that each time the interruption 39 occurs, the contents of the LED buffers 53A to 53D are issued from the group of terminals H on the micro processor 21. More specifically, when 1 is set in the LED buffer 53A, the day indication LED 16A in the input indication LED group 16 is dynamically illuminated through the groups of terminals H and I of the micro processor 21, calling operator's attention to entering a desired day. After the day indication ON processing, the processor sets 1 in the ST buffer 54A. This causes the processor to transfer to day input checking process, since 1 is already set in the ST buffer 54A if the micro processor 21 would go back to the reservation input processing 33. In the day input checking process, the micro processor checks that it accepted normal data from day push-buttons in the data push-button group 9. If so, the micro processor 21 proceeds to day-processing to store the normal day data in the day buffer 50B of the reservation data buffer 50. The processor 21 then puts 2 in the ST buffer 54A. This causes the micro processor 21 to go to day-indication-OFF processing in the next cycle. In the day indication OFF processing, the contents of the LED buffer 53A are changed to 0 to turn off the associated day LED. This causes the day indication LED 16A to go out, so that the micro processor 21 moves to the next start time indication ON processing. In the start time indication processing, similarly, setting of 1 in the LED buffer 53B will cause dynamic indication of the start-time indication LED 16B, calling operator's attention to entering a desired start-time. Subsequently, the micro processor 21 clears the system buffers 54B to 54E necessary for the start-time input and later sets 3 in the ST buffer 54A. As soon as 3 is placed in the ST buffer 54A, the micro processor 21 starts start-time processing. In the time input check processing, first, only the data necessary for time input is sent to start-time data processing. For other than the above, the micro processor 21 goes to buffer checking process where it checks the flags at the buffers 54B, and 54C to 54E which are set when the H/M (Hour/Minute) push-button and the AM or PM push-button in the data push-button group 9 are depressed. If it is a condition when all the inputs of start-time are done, the micro processor 21 sets 4 at the ST buffer 54A. In the start-time data processing, the contents of start time, that is, hour data and minute data are identified with the H/M push-button. That is, the data entered before the H/M push-button is first pushed is considered to be the hour input, while the data entered between the first pushing of the H/M push-button and the next pushing thereof is considered to be minute input. Each time the operator pushes the H/M push-button, the micro processor 21 adds 1 to the H/M buffer 54B within the system buffer. Further, flags at the buffers 54D and 54E determine whether or not the hour or minute data is a number of 2 figures. That is, the first data input will cause the 10 hour flag buffer 54D to be set to execute the data as a number of 1 figure. Subsequently, the second data input will cause the 10 hour flag buffer 54D to be reset to execute the former data and the latter data, respectively, as numbers of 2 figures and 1 figure. In this way, flags at the buffers 54D and 54E are used to alternately allocate the data. Similarly, input of data from an AM or PM push-button of the data push-button group 9 will cause the buffer 54C to be set. After this, by executing the buffer check, the micro processor 21 decides that all the data of start-time have been already entered. Therefore, if the H/M buffer 54B has 2 or more and the AM, PM buffer 54C is set, the micro processor 21 will increment +1 the contents of the ST buffer 54A into 4. As soon as the contents of the ST buffer 54A becomes 4, the micro processor 21 starts start-time indication OFF processing and then end-time indication ON processing. Here, if the operator clears the LED display buffer 53B and sets the buffer 53C, then end-time indication LED 16C will be illuminated dynamically. Then, the buffer 53C is cleared and the ST buffer 54A is increased +1 to 5, in order to use again at the end-time processing the system buffers 54B to 54E once used at the start-time processing. The similar processing is also applied to the end-time processing to put 6 in the ST buffer 54A. As soon as the ST buffer 54A becomes 6 in the contents, the micro processor starts end-time indication OFF processing and then selected-channel indication ON processing.

Now, clearing the LED display buffer 53C and setting the buffer 53D will cause the selected-channel indication LED 16D to illuminate dynamically. The micro processor will then change the contents of the ST buffer 54A to 7 to check the selected-channel input. When the operator specifies a reservation channel and the micro processor 21 has a low level at its input terminal L, the micro processor starts the selected-channel processing so as to store the selected-channel data into the reservation data buffer 54E and to set 8 at the ST buffer 54A.

When the contents of the ST buffer 54A has 8, the reservation input processing has been completed. Therefore, the micro processor 21 will transfer the data stored in the reservation data buffer 50 to either a reservation A data buffer 51 or a reservation E data buffer 52, according to the address buffer 50A, for a later selected-channel indication OFF processing. In the selected-channel indication OFF processing, the LED buffer 53D is cleared to turn off the input indication LED 16. Subsequently, the micro processor 21 clears the reservation data buffer 50 and the system buffer 54 used at the reservation input processing and finally, clears the flags that have caused the timer to be latched in the reservation mode.

With the arrangement as has been disclosed, the present invention has an advantage that the operator is required to enter the necessary reservation data only according to the title of input information sequentially indicated by the LED's, eliminating such a problem that the operator often forgets to return the control switches to the proper positions and thus providing a high controllability of the timer.

What we claim is:

1. A programmed timer for presetting a controlling device for a plurality of time when the device starts and ends, comprising clock means, means for entering reservation data, means for processing the entered data, display means for displaying the current time data from said clock means and the entered data, and means for sequentially displaying a procedure to be next entered according to the predetermined procedure order thereof, each time data is entered through said reservation data entering means.

2. A programmed timer as defined in claim 1, wherein means for displaying the current time is also used as means for displaying the entered data, and which includes display means for selectively displaying both of the current time data and the entered data.

3. A programmed timer as defined in claim 2, wherein said display means is provided with means which displays the current time data from said clock means before said data input means is operated, which displays the input data when said data input means is operated, and which automatically displays the current time after desired data have been entered.

4. A programmed timer as defined in claim 2, wherein said display means is provided with means for displaying the current time data from said clock means before said data input means is operated, for displaying the input data when said data input means is operated, and for automatically displaying the current time after desired data has been entered.

5. A programmed timer for presetting a video tape recorder for the time and reception channel when the video tape recorder starts and ends, comprising clock means, data input means for entering different data of desired time, day and reception channel when the video tape recorder starts and ends, means for processing in a predetermined order the data entered through said data input means, display means for displaying the current time data from said clock means and the data entered through said data input means, and procedure-order indicating means for sequentially indicating the type of data to be next entered each time different data are entered from said data input means.

6. A programmed timer for presetting a controllable device for a plurality of times when operation of the device is to start and end, comprising clock means for generating current time data; memory means for storing reservation data; means for entering in said memory means reservation data for a plurality of programs by storing at least the operation starting time and the operation ending time for each program; means for processing the stored data; display means for selectively displaying the current time data from said clock means and the entered data in said memory means; and procedure order indicating means for sequentially displaying indications of different kinds of reservation data to be next entered in each program according to a predetermined procedure order each time data is entered through said reservation data entering means.

7. A programmed timer as defined in claim 6, wherein said procedure order indicating means includes a plurality of indicators which respectively indicate when energized the various kinds of data to be entered for each program and means responsive to each entry of data relating to a program for energizing an indicator in accordance with a predetermined sequence.

8. A programmed timer as defined in claim 7, wherein said indicators indicate the day, the operation starting time, the operation ending time and a selected setting.

9. A programmed timer as defined in claim 6, further including means for automatically displaying the current time from said clock means after the last data is entered in accordance with the predetermined procedure order of a program.

10. A programmed timer for presetting a video tape recorder for the times and reception channels when operation of the video tape recorder is to start and end, comprising clock means for generating current time data; memory means for storing data; data input means for entering in said memory means different data for a plurality of programs by setting the operation starting time and operation ending time of said video tape recorder and the reception channel as a group for each program; means for processing in a predetermined order the data entered through said data input means; display means for displaying the current time data from said clock means and the data entered through said data input means; and procedure order indicating means for sequentially displaying the indication of different kinds of data to be next ordered according to the predetermined procedure order thereof each time data is entered through said data input means.

* * * * *